US009956941B2

(12) United States Patent
Kiyohara et al.

(10) Patent No.: US 9,956,941 B2
(45) Date of Patent: May 1, 2018

(54) ON-BOARD DEVICE CONTROLLING ACCUMULATION REMOVING UNITS

(71) Applicants: Clarion Co., Ltd., Saitama-shi, Saitama (JP); Nissan Motor Co., Ltd., Yokohama-shi, Kanagawa (JP)

(72) Inventors: Masahiro Kiyohara, Hitachi (JP); Kota Irie, Saitama (JP); Katsuyuki Nakamura, Kokubunji (JP); Shoji Muramatsu, Saitama (JP); Masayuki Takemura, Hitachi (JP); Osamu Fukata, Yokohama (JP); Yasuhisa Hayakawa, Yokohama (JP)

(73) Assignees: Clarion Co., Ltd., Saitama-shi (JP); Nissan Motor Co., Ltd., Yokohama-shi (JP)

( * ) Notice: Subject to any disclaimer, the term of this patent is extended or adjusted under 35 U.S.C. 154(b) by 458 days.

(21) Appl. No.: 14/409,689

(22) PCT Filed: Jul. 3, 2013

(86) PCT No.: PCT/JP2013/068274
§ 371 (c)(1),
(2) Date: Dec. 19, 2014

(87) PCT Pub. No.: WO2014/007294
PCT Pub. Date: Jan. 9, 2014

(65) Prior Publication Data

US 2015/0329083 A1 Nov. 19, 2015

(30) Foreign Application Priority Data

Jul. 3, 2012 (JP) ................................ 2012-149868

(51) Int. Cl.
*B60S 1/08* (2006.01)
*B60R 1/00* (2006.01)
(Continued)

(52) U.S. Cl.
CPC .............. *B60S 1/0848* (2013.01); *B60R 1/00* (2013.01); *H04N 5/2171* (2013.01); *B05B 12/08* (2013.01);
(Continued)

(58) Field of Classification Search
CPC ............................ B60S 1/0848; H04N 5/2171
See application file for complete search history.

(56) References Cited

U.S. PATENT DOCUMENTS

2007/0115357 A1 5/2007 Stein et al.
2010/0073492 A1* 3/2010 Kudo .................. H04N 5/2171 348/208.1
(Continued)

FOREIGN PATENT DOCUMENTS

EP 2 351 351 8/2011
JP 2001-171491 A 6/2001
(Continued)

OTHER PUBLICATIONS

European Search Report issued in counterpart European Application No. 13813697.3 dated Feb. 19, 2016 (12 pages).
(Continued)

*Primary Examiner* — Jamie Atala
*Assistant Examiner* — Hesham Abouzahra
(74) *Attorney, Agent, or Firm* — Crowell & Moring LLP

(57) ABSTRACT

An on-board device, that outputs a control signal to a cleaning control unit that controls accumulation removing units used to remove accumulations settled on a photographic lens in an on-board camera by adopting a plurality of methods, includes: an accumulation detection unit that detects an accumulation settled on the photographic lens from a photographic image output from the on-board camera when a vehicle speed input thereto is equal to or higher than a predetermined vehicle speed; a selection unit that selects
(Continued)

an accumulation removing unit adopting a first method among the accumulation removing units adopting the plurality of methods; and a removal decision unit that makes a decision, based upon the photographic image, as to whether or not the accumulation has been removed from the photographic lens through a removal operation performed by the accumulation removing unit adopting the first method, which has been selected by the selection unit, wherein: if the removal decision unit decides that the accumulation has not been removed from the photographic lens, the selection unit selects an accumulation removing unit adopting a second method, different from the accumulation removing unit adopting the first method, based upon a number of times that the removal operation has been performed by engaging the accumulation removing unit adopting the first method.

4 Claims, 15 Drawing Sheets

(51) Int. Cl.

| | |
|---|---|
| ***H04N 5/217*** | (2011.01) |
| *H04N 5/225* | (2006.01) |
| *G08G 1/16* | (2006.01) |
| *B05B 12/08* | (2006.01) |

(52) U.S. Cl.
CPC ............ *B60S 1/0844* (2013.01); *G08G 1/166* (2013.01); *G08G 1/167* (2013.01); *H04N 5/2252* (2013.01)

(56) References Cited

U.S. PATENT DOCUMENTS

2010/0074554 A1 3/2010 Gyotoku
2011/0073142 A1* 3/2011 Hattori .................. B60S 1/0848 134/56 R
2013/0092758 A1* 4/2013 Tanaka ...................... B60S 1/56 239/284.1

FOREIGN PATENT DOCUMENTS

| | | |
|---|---|---|
| JP | 2007-53448 A | 3/2007 |
| JP | 2008-277683 A | 11/2008 |
| JP | 2009-220719 A | 10/2009 |
| JP | 2010-109516 A | 5/2010 |
| JP | 2010-146284 A | 7/2010 |
| JP | 2011-240916 A | 12/2011 |

OTHER PUBLICATIONS

International Search Report dated Sep. 3, 2013 with English translation (five (5) pages).

* cited by examiner

200
CAN COMMUNICATION
CONTROL UNIT
RAM
ROM
CPU
10
11
12
52
CAMERA
1a
1
AIR NOZZLE
WASHER NOZZLE
WIPER
8
9
14
AIR PUMP
WASHER PUMP
WIPER DRIVE UNIT
6
7
13
CLEANING CONTROL UNIT
55
WARNING OUTPUT UNIT
OPERATING STATE REPORTING UNIT
3
4

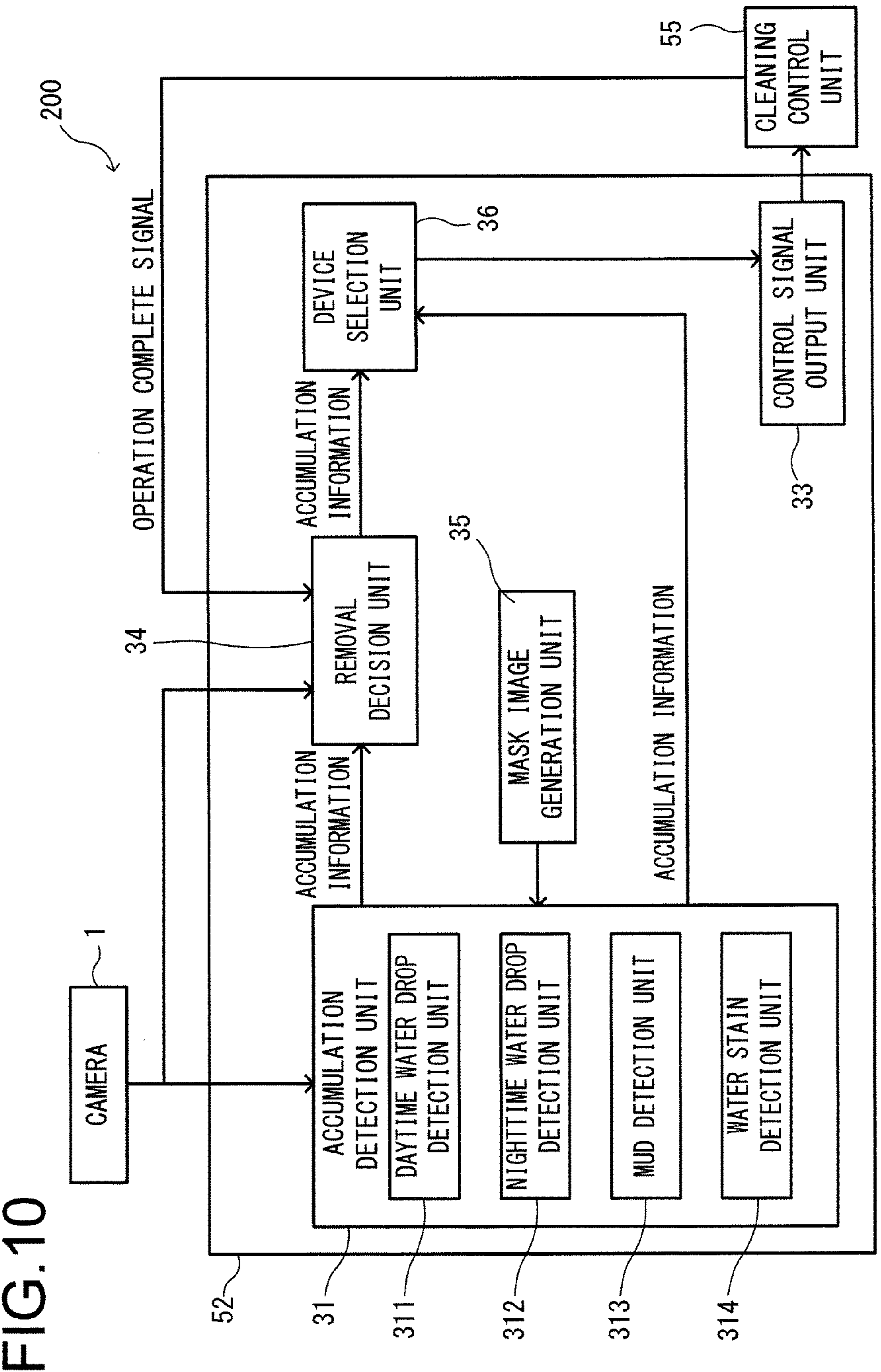
FIG.10
200
CAMERA
1
ACCUMULATION DETECTION UNIT
DAYTIME WATER DROP DETECTION UNIT
NIGHTTIME WATER DROP DETECTION UNIT
MUD DETECTION UNIT
WATER STAIN DETECTION UNIT
52
31
311
312
313
314
ACCUMULATION INFORMATION
REMOVAL DECISION UNIT
34
MASK IMAGE GENERATION UNIT
35
ACCUMULATION INFORMATION
DEVICE SELECTION UNIT
36
OPERATION COMPLETE SIGNAL
CONTROL SIGNAL OUTPUT UNIT
33
CLEANING CONTROL UNIT
55

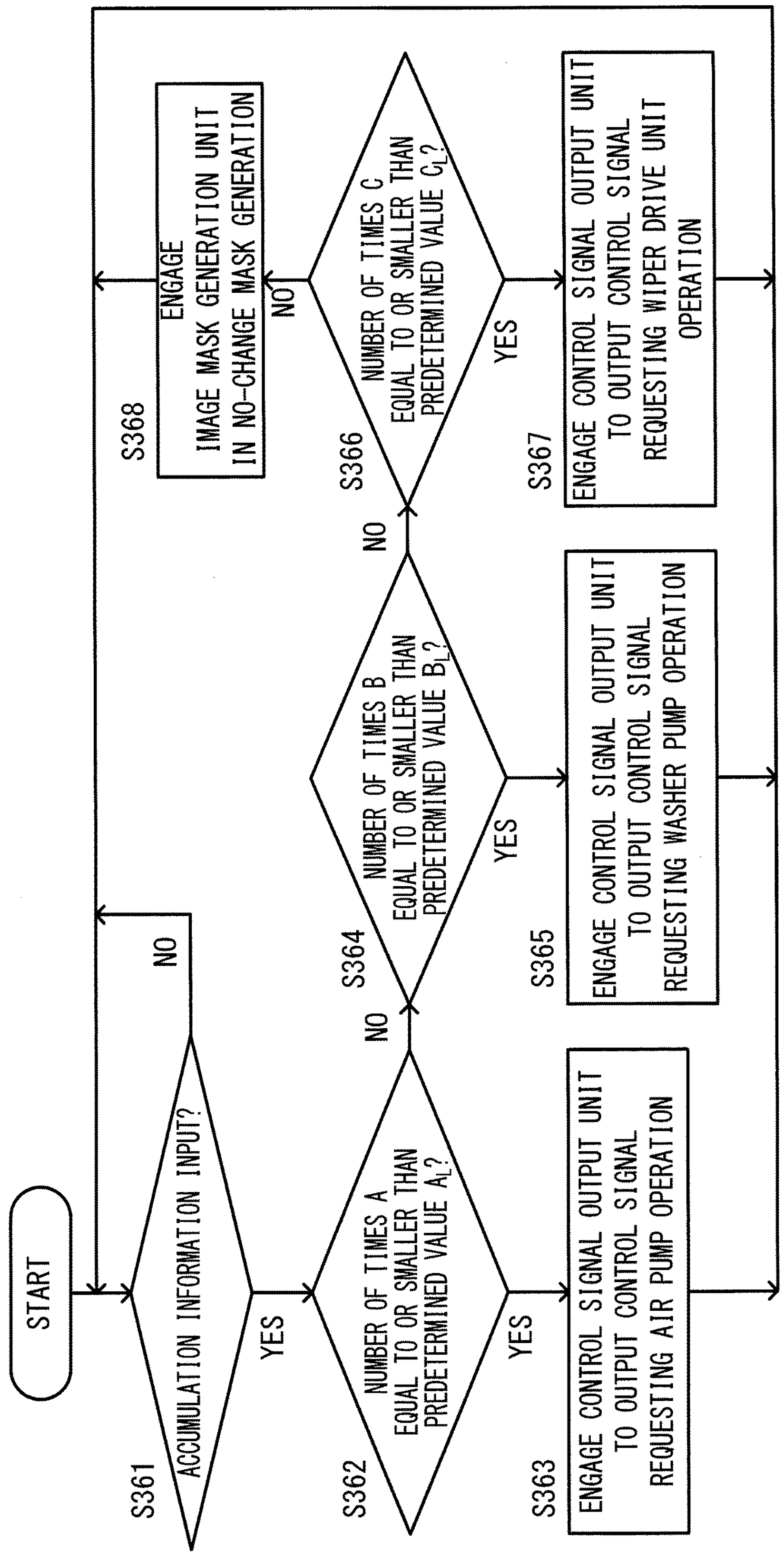
FIG.11
START
S361
ACCUMULATION INFORMATION INPUT?
YES
NO
S362
NUMBER OF TIMES A EQUAL TO OR SMALLER THAN PREDETERMINED VALUE A_L?
YES
NO
S363
ENGAGE CONTROL SIGNAL OUTPUT UNIT TO OUTPUT CONTROL SIGNAL REQUESTING AIR PUMP OPERATION
S364
NUMBER OF TIMES B EQUAL TO OR SMALLER THAN PREDETERMINED VALUE B_L?
YES
NO
S365
ENGAGE CONTROL SIGNAL OUTPUT UNIT TO OUTPUT CONTROL SIGNAL REQUESTING WASHER PUMP OPERATION
S366
NUMBER OF TIMES C EQUAL TO OR SMALLER THAN PREDETERMINED VALUE C_L?
YES
NO
S367
ENGAGE CONTROL SIGNAL OUTPUT UNIT TO OUTPUT CONTROL SIGNAL REQUESTING WIPER DRIVE UNIT OPERATION
S368
ENGAGE IMAGE MASK GENERATION UNIT IN NO-CHANGE MASK GENERATION

FIG.14

| | | CLEANING DEVICE | | |
|---|---|---|---|---|
| | | AIR | WASHER | WIPER |
| ACCUMULATION | WATER DROP | CLEANING OK | CLEANING OK | CLEANING OK |
| | MUD | CLEANING NG | CLEANING OK | CLEANING NG |
| | WATER STAIN | CLEANING NG | CLEANING NG | CLEANING OK |
| | LENS SCRATCH | CLEANING NG | CLEANING NG | CLEANING NG |

ON-BOARD DEVICE CONTROLLING ACCUMULATION REMOVING UNITS

TECHNICAL FIELD

The present invention relates to an on-board device.

BACKGROUND ART

An on-board camera, which is often mounted on the outside of the vehicle, may include a foreign matter removal system to promptly remove an accumulation of foreign matter such as water drops, mud and snow melting agents, which tend to readily occur at the photographic lens thereof. There is an image-capturing device proposed in the related art, which is capable of verifying whether or not foreign matter has been removed from an optical member (see patent literature 1).

CITATION LIST

Patent Literature

Patent literature 1: Japanese Laid Open Patent Publication No. 2010-109516

SUMMARY OF INVENTION

Technical Problem

An object of the present invention is to ensure that the photographic lens in an on-board camera is washed in an optimal manner.

Solution to Problem

An on-board device, according to a first aspect of the present invention, that outputs a control signal to a cleaning control unit that controls accumulation removing units used to remove accumulations settled on a photographic lens in an on-board camera by adopting a plurality of methods, comprises: an accumulation detection unit that detects an accumulation settled on the photographic lens from a photographic image output from the on-board camera when a vehicle speed input thereto is equal to or higher than a predetermined vehicle speed; a selection unit that selects an accumulation removing unit adopting a first method among the accumulation removing units adopting the plurality of methods; and a removal decision unit that makes a decision, based upon the photographic image, as to whether or not the accumulation has been removed from the photographic lens through a removal operation performed by the accumulation removing unit adopting the first method, which has been selected by the selection unit, wherein: if the removal decision unit decides that the accumulation has not been removed from the photographic lens, the selection unit selects an accumulation removing unit adopting a second method, different from the accumulation removing unit adopting the first method, based upon a number of times that the removal operation has been performed by engaging the accumulation removing unit adopting the first method.

According to a second aspect of the present invention, in the on-board device according to the first aspect, it is preferable to further comprise: a mask image storing unit that stores, if the removal decision unit decides that an accumulation has not been removed from the photographic lens even after a removal operation has been performed by engaging each of the accumulation removing units adopting the plurality of methods a predetermined plurality of number of times set in correspondence to each of the accumulation removing units adopting the plurality of methods, an image of the unremoved accumulation as a mask image, wherein: the accumulation detection unit does not regard the accumulation stored as the mask image in the mask image storing unit as a detection target.

According to a third aspect of the present invention, in the on-board device according to the second aspect, it is preferable that the accumulation removing unit adopting the first method removes the accumulation by using compressed air; the accumulation removing unit adopting the second method removes the accumulation by using a washer liquid; when the number of times a removal operation has been performed by engaging the accumulation removing unit adopting the first method is equal to or smaller than a first predetermined value, the selection unit selects the accumulation removing unit adopting the first method; when the number of times a removal operation has been performed by engaging the accumulation removing unit adopting the first method is greater than the first predetermined value and the number of times a removal operation has been performed by engaging the accumulation removing unit adopting the second method is equal to or smaller than a second predetermined value, the selection unit selects the accumulation removing unit adopting the second method; and when the number of times a removal operation has been performed by engaging the accumulation removing unit adopting the first method is greater than the first predetermined value and the number of times a removal operation has been performed by engaging the accumulation removing unit adopting the second method is greater than the second predetermined value, the mask image storing unit stores the mask image.

According to a fourth aspect of the present invention, in the on-board device according to the third aspect, it is preferable that the accumulation removing unit adopting the plurality of methods further includes an accumulation removing unit adopting a third method that removes the accumulation by using a wiper; when the number of times a removal operation has been performed by engaging the accumulation removing unit adopting the first method is equal to or smaller than the first predetermined value, the selection unit selects the accumulation removing unit adopting the first method; when the number of times a removal operation has been performed by engaging the accumulation removing unit adopting the first method is greater than the first predetermined value and the number of times a removal operation has been performed by engaging the accumulation removing unit adopting the second method is equal to or smaller than the second predetermined value, the selection unit selects the accumulation removing unit adopting the second method; when the number of times a removal operation has been performed by engaging the accumulation removing unit adopting the first method is greater than the first predetermined value, the number of times a removal operation has been performed by engaging the accumulation removing unit adopting the second method is greater than the second predetermined value and the number of times a removal operation has been performed by engaging the accumulation removing unit adopting the third method is equal to or smaller than a third predetermined value, the selection unit selects the accumulation removing unit adopting the third method; and when the number of times a removal operation has been performed by engaging the accumulation removing unit adopting the first method is greater than the first predetermined value, the number of times a removal operation has been performed by engaging the accumulation removing unit adopting the second method is greater than the second predetermined value and the number of times a removal operation has been performed by engaging the accumulation removing unit adopting the third method is greater than the third predetermined value, the mask image storing unit stores the mask image.

According to a fifth aspect of the present invention, in the on-board device according to the third aspect, it is preferable that the removal decision unit further determines a type of accumulation having been removed through the removal operation performed by the accumulation removing unit adopting the first method, having been selected by the selection unit; the removal decision unit identifies an accumulation having been removed through the removal operation performed by the accumulation removing unit adopting the first method as a water drop accumulation; and the removal decision unit identifies an accumulation removed through the removal operation performed by the accumulation removing unit adopting the second method as a mud accumulation.

According to a sixth aspect of the present invention, in the on-board device according to the fourth aspect, it is preferable that the removal decision unit further determines a type of accumulation having been removed through the removal operation performed by the accumulation removing unit adopting the first method, having been selected by the selection unit; the removal decision unit identifies an accumulation having been removed through the removal operation performed by the accumulation removing unit adopting the first method as a water drop accumulation; the removal decision unit identifies an accumulation removed through the removal operation performed by the accumulation removing unit adopting the second method as a mud accumulation; and the removal decision unit identifies an accumulation removed through the removal operation performed by the accumulation removing unit adopting the third method as a water stain accumulation.

Advantageous Effect of the Invention

According to the present invention, the condition of the photographic lens in an on-board camera can be accurately determined and the presence of any dirt having adhered to the photographic lens can be verified.

DESCRIPTION OF EMBODIMENTS

First Embodiment

Figure 1:
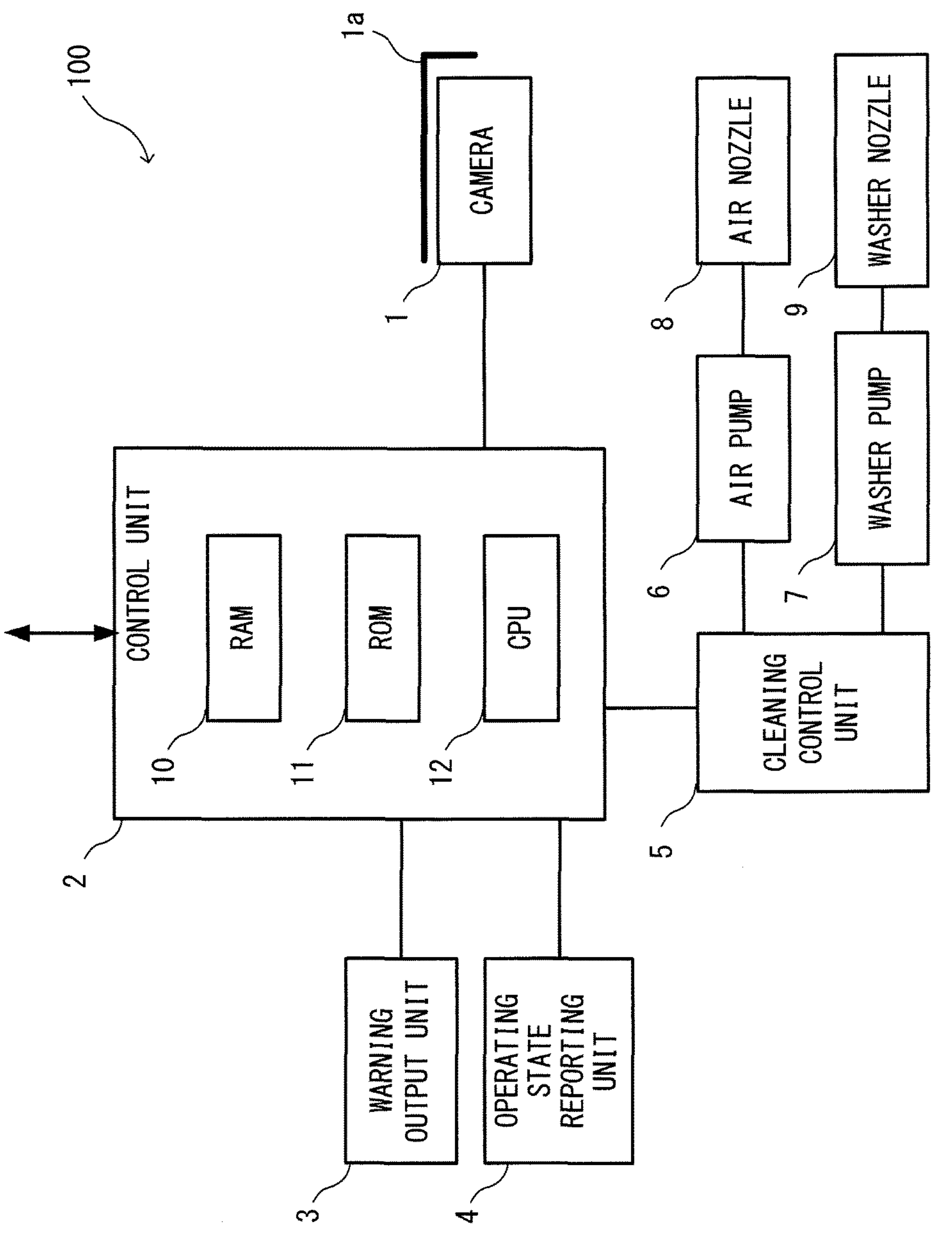
FIG. 1 A block diagram of an on-board device achieved in a first embodiment of the present invention FIG. 2 An illustration of the photographic field and the shielded area pertaining to the camera FIG. 3 An example of a mounting position at which the camera may be installed FIG. 4 A control block diagram pertaining to the on-board device achieved in the first embodiment of the present invention FIG. 5 An example of a flowchart pertaining to a daytime water drop detection unit FIG. 6 An example of a flowchart pertaining to a night-time water drop detection unit FIG. 7 An example of a flowchart pertaining to a removal decision unit FIG. 8 An example of a flowchart pertaining to a device selection unit in the on-board device achieved in the first embodiment of the present invention FIG. 9 A block diagram of the on-board device achieved in a second embodiment of the present invention FIG. 10 A control block diagram pertaining to the on-board device achieved in the second embodiment of the present invention FIG. 11 An example of a flowchart pertaining to the device selection unit in the on-board device achieved in the second embodiment of the present invention FIG. 12A-C Illustrations in reference to which the no-change mask generating operation is to be explained FIG. 13 An illustration showing how the no-change mask is utilized FIG. 14 A chart indicating specific types of removal devices that may be used for different types of foreign matter accumulation FIG. 15 An illustration showing how a differential image is generated

FIG. 1 is a block diagram of an on-board device 100 achieved in an embodiment of the present invention. The on-board device 100 in FIG. 1, which is installed at a vehicle, comprises a camera 1 with a light shielding plate 1*a* mounted thereat, a control unit 2, a warning output unit 3, an operating state reporting unit 4, a cleaning control unit 5, an air pump 6, a washer pump 7, an air nozzle 8 and a washer nozzle 9.

The camera 1, disposed so as to face toward the space behind the vehicle, captures images within a photographic field that includes the road surface stretching behind the vehicle at predetermined time intervals. The camera 1 includes an image sensor such as a CCD sensor or a CMOS sensor. The photographic image obtained via the camera 1 is output from the camera 1 to the control unit 2.

Figure 2:
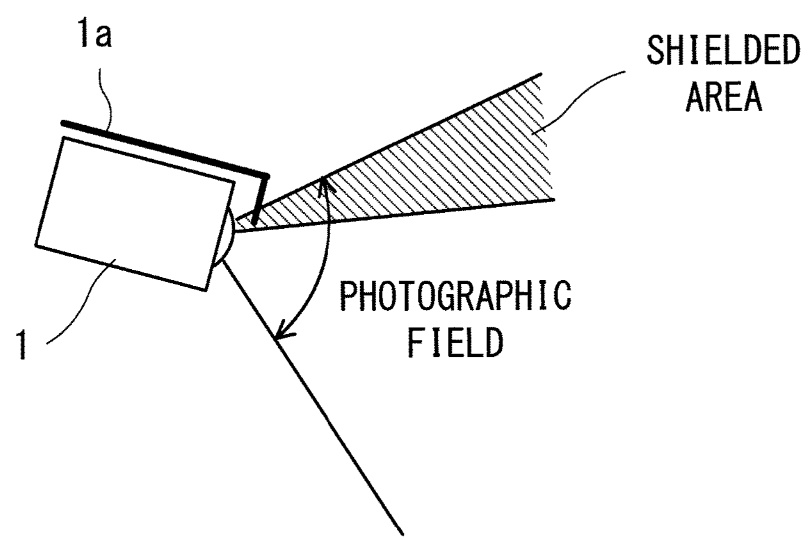

The light shielding plate 1*a* is mounted at the camera 1 so as to block part of the light advancing toward the photographic lens in the camera 1. FIG. 2 shows a side view of the photographic field and the shielded area with regard to the camera 1. As FIG. 2 shows, part of the upper side of the photographic field of the camera 1 is masked with the light shielding plate 1*a*, thereby forming a shielded area. The camera 1 captures an image, which includes the road surface behind the vehicle, in the photographic field excluding the shielded area. The photographic field (the angle of view) is set over a relatively wide range so as to allow the camera to capture an image of the road surface behind the vehicle in a sufficiently wide range along the left/right direction. This means that unwanted light originating from sources other than the road surface, such as the sky and the background, in the photographic field will also enter the camera 1. Accordingly, the shielded area is created via the light shielding plate 1*a* so that entry of such unwanted light at the camera 1 is blocked.

Figure 3:
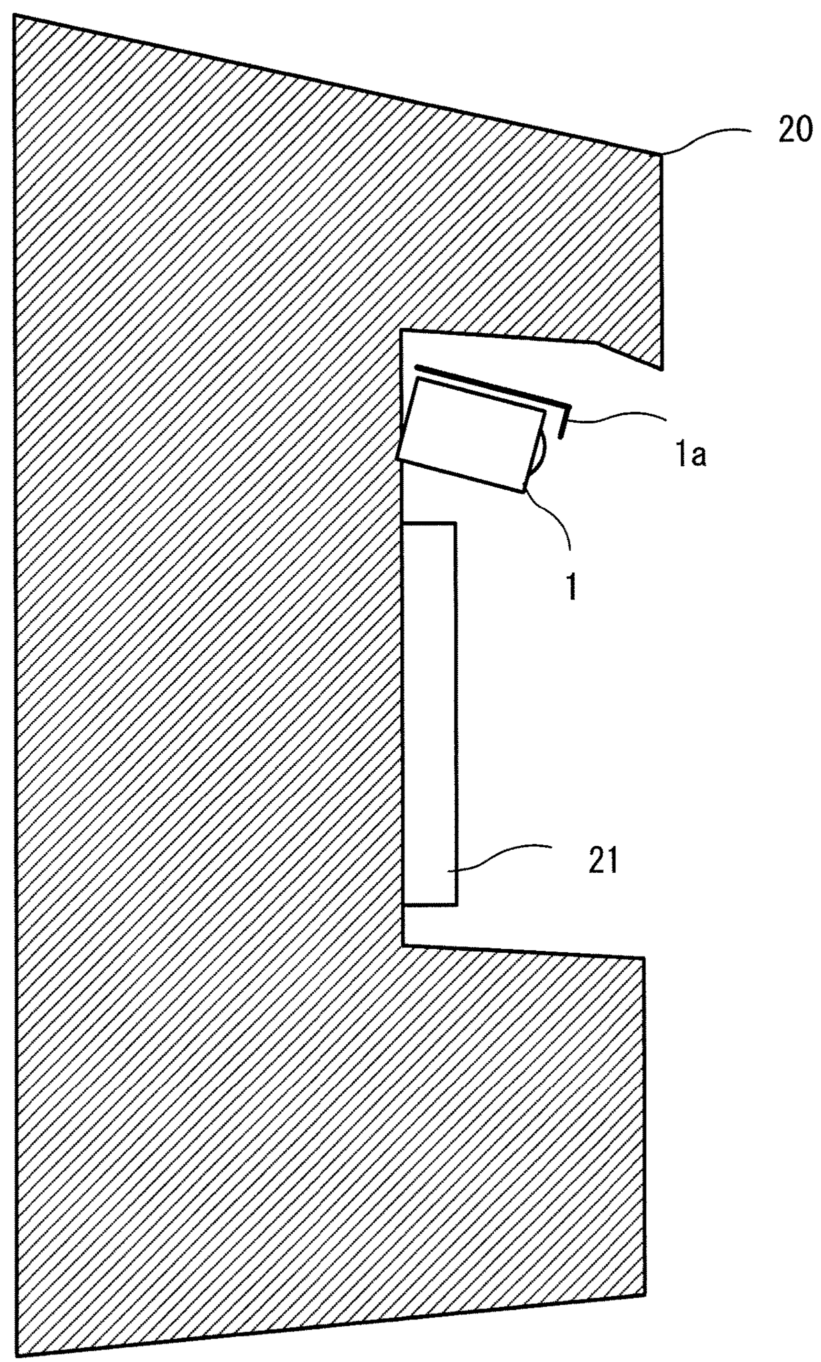

FIG. 3 presents an example of a mounting position at which the camera 1 may be installed. A number plate 21 is mounted at a body 20 at the rear of the subject vehicle. The camera 1 is mounted so as to face downward diagonally from a position directly above the number plate 21, with the light shielding plate 1*a* mounted above the camera 1. It is to be noted that the mounting position in this figure simply represents an example and the camera 1 may be mounted at another position. The mounting position for the camera 1 may be determined freely, as long as an image of the road surface behind the vehicle can be captured over an optimal range.

The control unit 2 includes a RAM 10, a ROM 11 and a CPU 12. The control unit 2 stores photographic images from the camera 1 into the RAM 10, executes predetermined image processing by using the photographic images and executes various types of control based upon the processing results. Under the control executed by the control unit 2, various functions such as the LDW (lane departure warning) function, the PED (pedestrian detection) function, the RSR (road sign recognition) function and the IMD (image diagnosis) function are achieved in the on-board device 100. Through the LDW function, a white line on the road surface (such as a traffic lane line, a lane edge or a central line) is detected and a warning is output if the subject vehicle appears to be about to depart the current lane. Through the PED function, a human shape in a photographic image is detected so as to alert the driver to the presence of a pedestrian in the path on which the subject vehicle is advancing. Through the RSR function, a traffic sign on the road captured in a photographic image is recognized and the driver is given a warning if, for instance, the subject vehicle is traveling at a speed exceeding the speed limit indicated in the sign. Through the IMD function, a diagnosis is executed so as to determine whether or not photographic images are correctly captured via the camera 1.

The warning output unit 3 generates warnings to be issued via a warning lamp, an alarm buzzer and the like to the driver of the vehicle. Operations of the warning output unit 3 are controlled by the control unit 2. A warning is output via the warning output unit 3 under the control executed by the control unit 2 if, for instance, the subject vehicle is determined to be about to depart the current lane through the LDW function or if a person with whom the vehicle could collide is detected through the PED function.

The operating state reporting unit 4 reports the operating state of the on-board device 100 to the driver of the vehicle. For instance, if specific operating conditions are not satisfied and the on-board device 100 is thus in a non-operating state, the operating state reporting unit 4 issues a warning to the driver by turning on a lamp installed near the driver's seat in the vehicle under control executed by the control unit 2. Through these measures, the driver is warned that the on-board device 100 is in a non-operating state.

The cleaning control unit 5 controls operations of the air pump 6 and the washer pump 7 under control executed by the control unit 2. For instance, if it is decided through the IMD function described earlier that good photographic images cannot be captured due to foreign matter such as water drops, mud or a snow melting agent that has accumulated on the camera 1, the control unit 2 outputs a control signal, carrying a request for operation of the air pump 6 or the washer pump 7, to the cleaning control unit 5. In response to this signal, the cleaning control unit 5 controls the operation of the air pump 6 or the washer pump 7. The cleaning control unit 5 engages the air pump 6 or the washer pump 7 in operation so as to remove the accumulated foreign matter, and subsequently outputs a signal, referred to as an operation complete signal, which indicates that the air pump 6 or the washer pump 7 has been engaged in operation, to the control unit 2.

The air pump 6, engaged in operation under the control executed by the cleaning control unit 5, outputs compressed air to the air nozzle 8. As this compressed air is forced through the air nozzle 8 toward the camera 1, foreign matter such as water drops, having accumulated on the photographic lens at the camera 1, is blown off and the photographic lens is thus cleaned.

The washer pump 7, engaged in operation under control executed by the cleaning control unit 5, outputs a washer liquid supplied from a washer tank (not shown) to the washer nozzle 9. As the washer liquid is ejected from the washer nozzle 9 toward the camera 1, accumulated foreign matter such as mud, which cannot easily be removed with compressed air from the air nozzle 8, is washed off.

Figure 4:
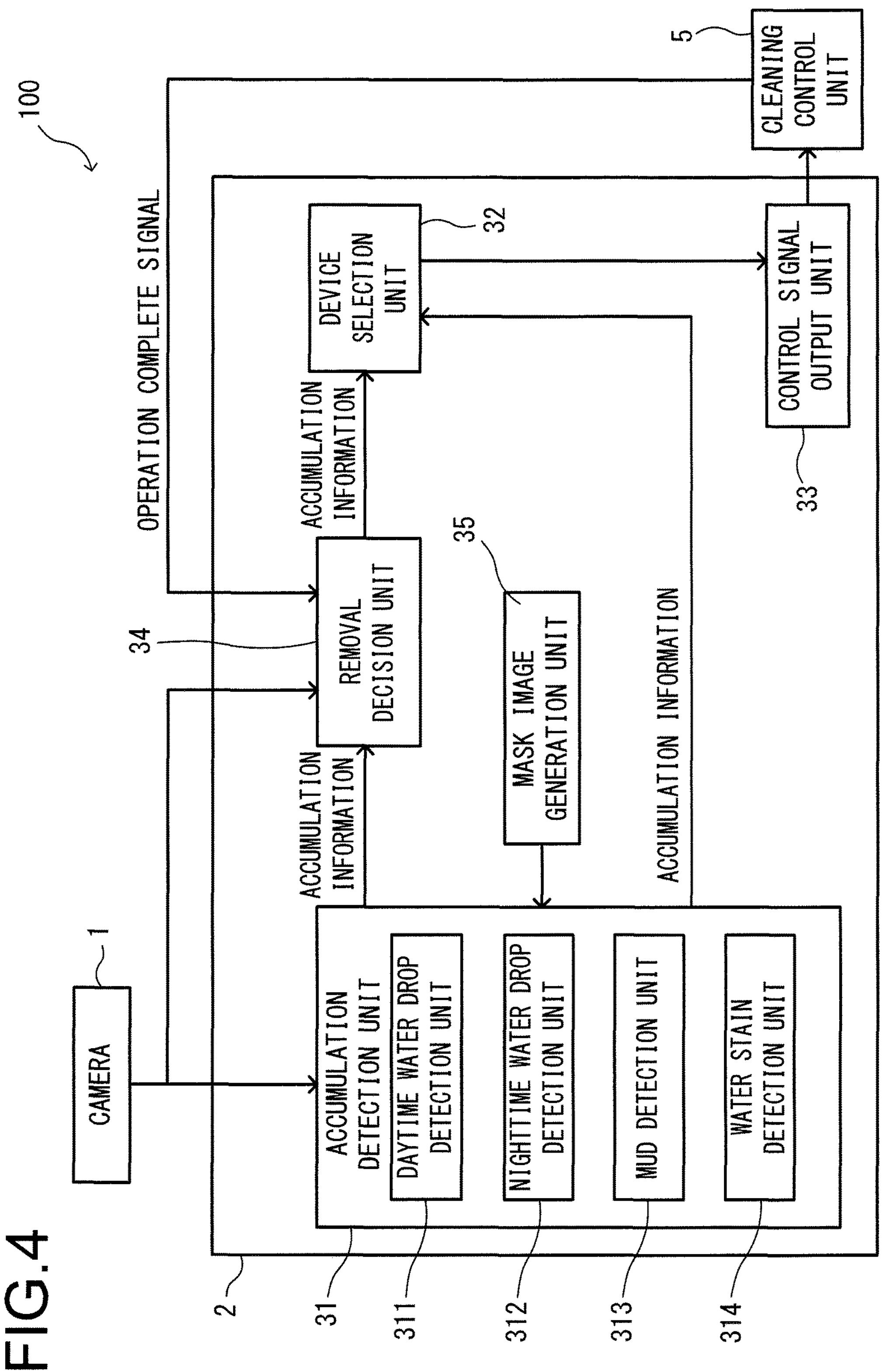

FIG. 4 is a control block diagram presenting an example of control block configuration that may be adopted in the on-board device achieved in the first embodiment of the present invention. The control unit 2 in the on-board device 100 shown in FIG. 4 functions as an accumulation detection unit 31, a device selection unit 32, a control signal output unit 33, a removal decision unit 34 and a mask image generation unit 35.

The accumulation detection unit 31 detects foreign matter accumulation from photographic images output by the camera 1. The accumulation detection unit 31 includes a daytime water drop detection unit 311, a nighttime water drop detection unit 312, a mud detection unit 313, a water stain detection unit 314 and the like.

The photographic images output from the camera 1 are input to the daytime water drop detection unit 311, the nighttime water drop detection unit 312, the mud detection unit 313, the water stain detection unit 314 and the like in the accumulation detection unit 31. The daytime water drop detection unit 311 and the nighttime water drop detection unit 312 detect water drops on the camera from the photographic image. The daytime water drop detection unit 311 and the nighttime water drop detection unit 312 are selectively engaged in operation in correspondence to the brightness in the environment around the vehicle. If the vehicle is in a bright environment (during the daytime), the daytime water drop detection unit 311 is engaged in operation, whereas if the vehicle is in a dark environment (during the nighttime), the nighttime water drop detection unit 312 is engaged in operation. The mud detection unit 313 detects mud accumulation on the camera from the photographic image. The water stain detection unit 314 detects a buildup of water stains from the photographic image. Information indicating the position, the shape, the size and the like of each accumulation or deposit, detected by any of the units included in the accumulation detection unit 31, is output as accumulation information to the device selection unit 32 and the removal decision unit 34.

It is to be noted that a scratch on the lens, foreign matter settled on the light shielding plate 1*a* or the like that cannot be removed may be indicated in the detection results provided by a unit in the accumulation detection unit 31 as foreign matter such as water drops, mud or water stains. If compressed air or the washer liquid is repeatedly output in order to remove such a scratch or unremovable foreign matter, mud may become dried with the compressed air, or the washer tank (not shown) may become depleted. In order to prevent wasteful outputs of compressed air and washer liquid in an attempt to remove unremovable foreign matter, the accumulation detection unit 31 uses an image of the un-removable matter as a mask image during accumulation detection. In the following description, the mask image used by the accumulation detection unit 31 will be referred to as a no-change mask. After executing specific types of image processing, such as edge detection processing, on the photographic image, the accumulation detection unit 31 uses the no-change mask so as to ensure that no accumulation is detected from the image area masked by the no-change mask. The no-change mask is generated by the mask image generation unit 35.

The device selection unit 32 selects either the air pump 6 or the washer pump 7 as an accumulation removing unit to be used to remove (blow off or wash off) the accumulation detected by the accumulation detection unit 31, from the photographic lens. In response to accumulation information input thereto from the accumulation detection unit 31 or the removal decision unit 34, the device selection unit 32 outputs information pertaining to the selected accumulation removing unit to the control signal output unit 33. The device selection unit 32 selects the accumulation removing unit based upon a number of times A a removal operation has been performed with compressed air by engaging the air pump 6 in operation and a number of times B a removal operation has been performed by engaging the washer pump 7 in operation. The number of times A and the number of times B are stored in the RAM 10 and this information in the RAM 10 is shared by the device selection unit 32 and the removal decision unit 34. It is to be noted that the number of times A and the number of times B may be initialized when an accumulation is detected by the accumulation detection unit 31.

The control signal output unit 33 generates a control signal that will request an operation of the accumulation removing unit selected by the device selection unit 32 and outputs the control signal to the cleaning control unit 5. The control signal includes information related to the accumulation removing unit selected by the device selection unit 32 and information indicating control quantities such as the cleaning intensity and the cleaning duration.

After the cleaning control unit 5 completes the operation control for the air pump 6 or the washer pump 7, the removal decision unit 34 makes a decision as to whether or not the accumulation has been removed (blown off or washed off) from the photographic lens. Photographic images are input, one frame at a time, to the removal decision unit 34 from the camera 1. An operation complete signal is also input to the removal decision unit 34 from the cleaning control unit 5.

Once an operation complete signal provided by the cleaning control unit 5 is input thereto, the removal decision unit 34 generates a differential image expressing the difference between a photographic image captured prior to the removal operation and a photographic image captured after the removal operation and makes a decision based upon the differential image as to whether or not the accumulation has been removed (blown off or washed off). If it is decided that the accumulation has not been removed, the removal decision unit 34 increments the number of times the accumulation removing unit, which has performed the removal operation, has been engaged in operation, and outputs the accumulation information input thereto from the accumulation detection unit 31 to the device selection unit 32. Upon receiving the accumulation information output from the removal decision unit 34, the device selection unit 32 selects an accumulation removing unit based upon the incremented number of times, and outputs information pertaining to the selected accumulation removing unit to the control signal output unit 33.

The mask image generation unit 35 generates or updates a no-change mask. In response to a request for no-change mask generation issued by the device selection unit 32, the mask image generation unit 35 obtains an image captured after the removal operation from the removal decision unit 34, and generates or updates a no-change mask based upon the image thus obtained. The no-change mask generated as described above is then stored into a storage medium such as the RAM 10.

Figure 12A:
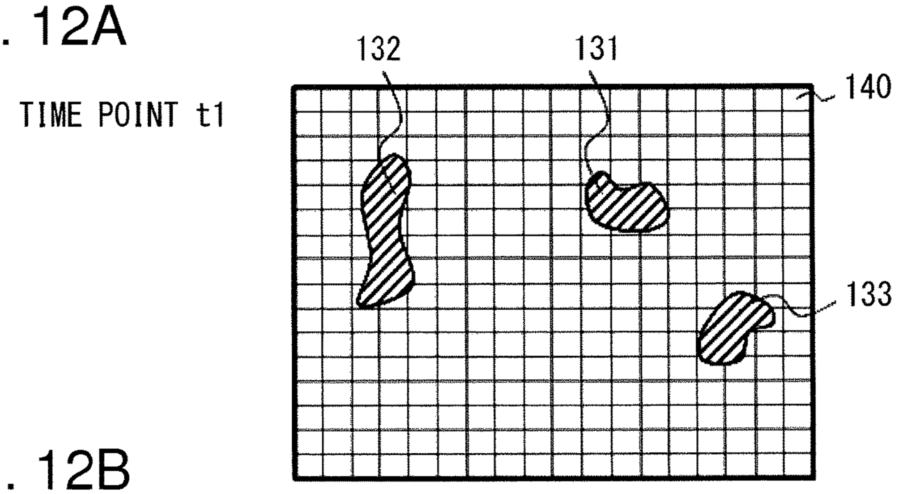
Figure 12B:
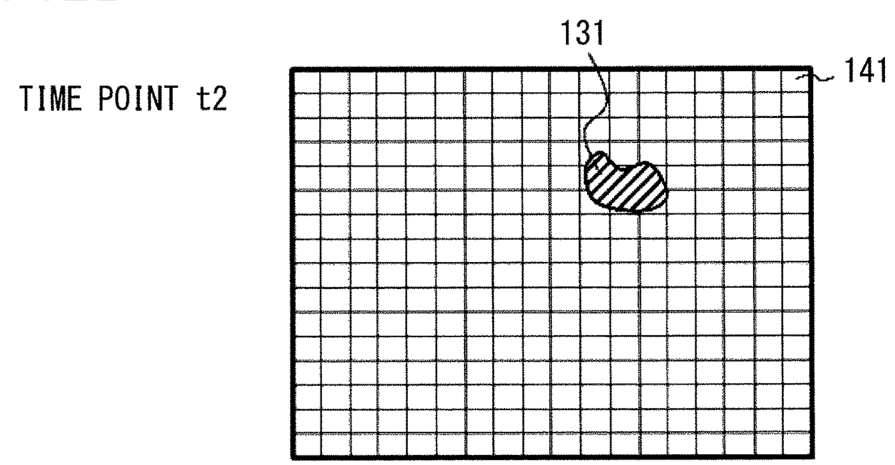
Figure 12C:
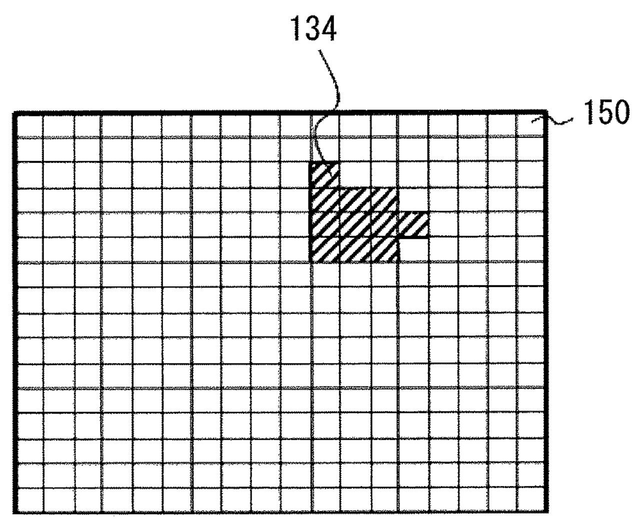

In reference to an example presented in FIGS. 12(*a*) through 12(*c*), the operation executed for purposes of no-change mask generation will be described. FIG. 12(*a*) shows that an accumulation 131, an accumulation 132 and an accumulation 133 are detected in an image 140 taken at a time point t1 prior to a cleaning operation. Through the subsequent cleaning operation, the accumulation 132 and the accumulation 133 among the accumulations listed above, are removed. As a result, only the accumulation 131 remains on the lens at a time point t2 following the cleaning operation, as an image 141 in FIG. 12(*b*) indicates. The mask image generation unit 35 generates a no-change mask 150, such as that shown in FIG. 12(*c*), based upon the image 141 taken at the time point t2. The no-change mask 150 holds information with respect to a no-change area 134 at a position corresponding to the remaining accumulation 131. It is to be noted that the resolution of the no-change mask 150 may be lower than that of the image 140 and the image 141. By lowering the resolution for the no-change mask 150, the storage area can be utilized more efficiently and the length of time for processing executed by using the no-change mask can be reduced.

Figure 13:
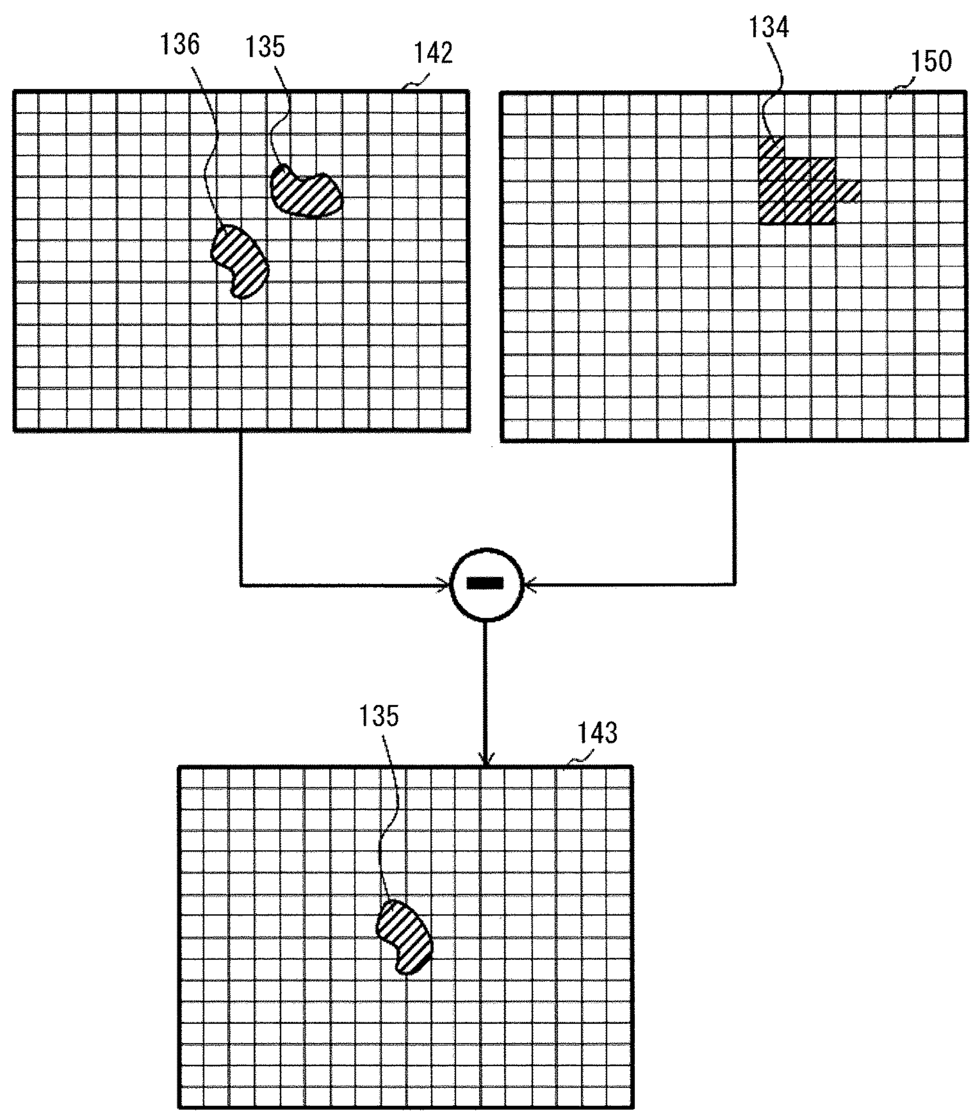

Next, in reference to the example presented in FIG. 13, the method with which the no-change mask is used will be explained. FIG. 13 shows an image 142 captured at a time point t3, in which an accumulation 135 and an accumulation 136 are detected. The no-change mask 150 has been generated during a previous cleaning operation. In this situation, the CPU 12 specifies an area which matches an accumulation area in the image 142 but does not match the no-change area in the no-change mask 150 (this area will be referred to as an accumulation area after no-change mask application). For instance, the CPU may raster scan the image starting at the upper left corner of the image, and may register each pixel contained in the accumulation area and not contained in the no-change area, as part of an accumulation area after no-change mask application. The accumulation area after no-change mask application indicates the area over which a newly settled accumulation ranges.

Figure 5:
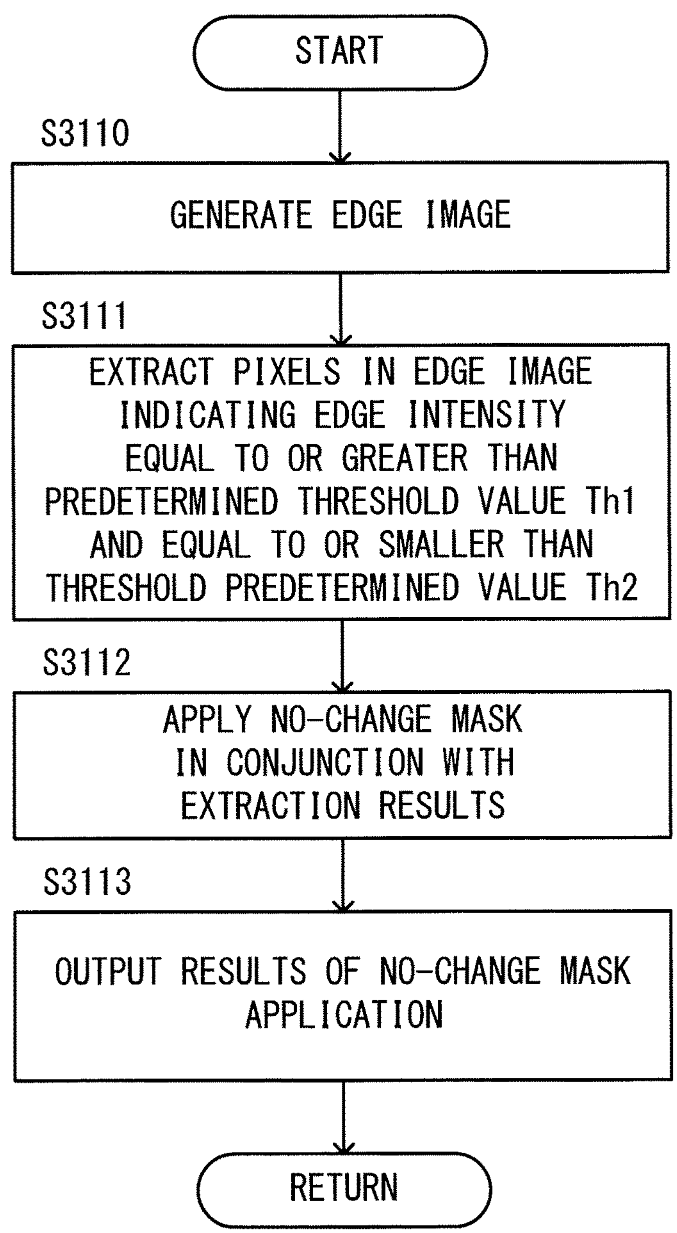

FIG. 5 presents a flowchart pertaining to the daytime water drop detection unit 311. In step S3110, the CPU 12 generates an edge image by executing edge detection processing of the known art on a photographic image output by the camera 1. In step S3111, the CPU 12 extracts pixels with low edge intensity and thus expressing a blurred edge in the edge image having been generated in step S3110. The CPU 12 extracts any edge included in the edge image, having edge intensity equal to or greater than a predetermined threshold value Th1 and equal to or smaller than a predetermined threshold value Th2. The rationale for this processing is that when the surrounding environment is bright, as in daytime, a water drop is expressed as a weak edge in an edge image. In step S3112, the CPU 12 uses a no-change mask having been generated by the mask image generation unit 35 in conjunction with the extraction results obtained through step S3111. In step S3113, the CPU 12 outputs extraction results obtained by using the no-change mask in conjunction with the initial extraction results from step S3111, as water drop accumulation.

Figure 6:
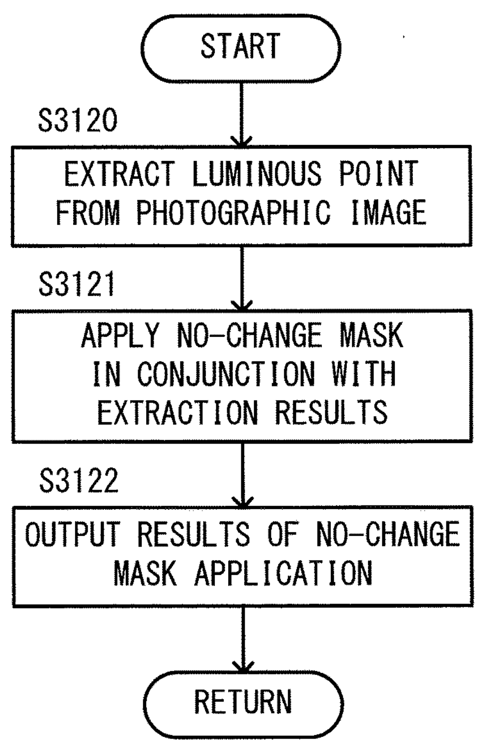

FIG. 6 presents a flowchart pertaining to the nighttime water drop detection unit 312. The operational rationale of the nighttime water drop detection unit 312 is that when the vehicle is in darkness, such as during nighttime, light from a headlight or the like of a vehicle behind the subject vehicle is likely to be reflected or refracted at a water drop settled on the photographic lens and the water drop is thus expressed as a luminous point in a photographic image. In step S3120, the CPU 12 extracts such a luminous point in a photographic image output by the camera 1. In step S3121, the CPU 12 uses a no-change mask having been generated by the mask image generation unit 35 in conjunction with the extraction results obtained through step S3120. In step S3122, the CPU outputs extraction results obtained by using the no-change mask in conjunction with the initial extraction results from step S3120, as water drop accumulation.

Figure 7:
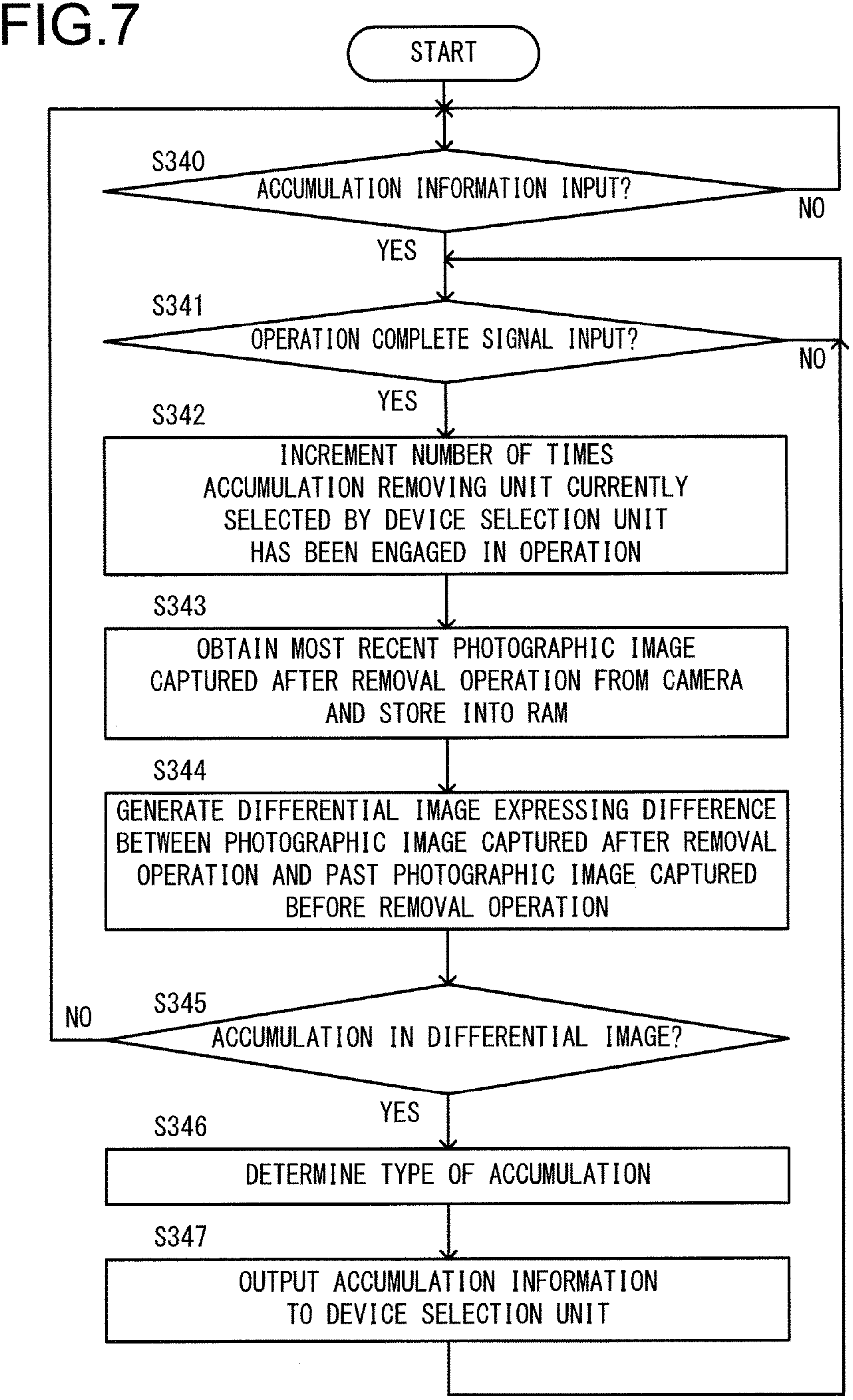

FIG. 7 presents a flowchart pertaining to the removal decision unit 34. In step S340, the CPU 12 makes a decision as to whether or not accumulation information has been input from the accumulation detection unit 31. Until accumulation information is input, the CPU 12 repeatedly executes the processing in step S340, and once accumulation information has been input, it proceeds to execute the processing in step S341.

In step S341, the CPU 12 makes a decision as to whether or not an operation complete signal has been input from the cleaning control unit 5. The CPU 12 repeatedly executes the processing in step S341 until an operation complete signal is input, and once an operation complete signal has been input, it proceeds to execute the processing in step S342.

In step S342, the CPU 12 increments the number of times (the number of times A or the number of times B) that the accumulation removing unit currently selected by the device selection unit 32 (i.e., the accumulation removing unit which has completed the removal operation) has been engaged in operation.

In step S343, the CPU 12 obtains the most recent photographic image captured after the removal operation from the camera 1, and stores the photographic image into the RAM 10. In step S344, the CPU 12 generates a differential image representing the difference between the photographic image captured after the removal operation, having been obtained through step S343, and a photographic image captured before the removal operation.

In step S345, the CPU 12 makes a decision as to whether or not an image of any unremoved accumulation is included in the differential image generated in step S344. If an affirmative decision is made in step S345, i.e., if the differential image includes an image of unremoved accumulation, the CPU 12 proceeds to execute the processing in step S346. If, on the other hand, the negative decision is made in step S345, it proceeds to execute the processing in step S340.

In step S346, the CPU 12 makes a decision with regard to the type of each accumulation having been removed. The CPU 12 determines the type of each accumulation based upon the change in the luminance of the pixel cluster representing the accumulation, observed in the post-removal operation state relative to the pre-removal operation state, the size or shape of the accumulation, the number of times A, the number of times B, the specific type of accumulation removing unit most recently engaged in operation and the like. For instance, an accumulation having been removed or having manifested a change in its shape as a result of a removal operation performed by the air pump 6 at least once will be determined to be a water drop. An accumulation that initially remains unremoved even by performing a removal operation three times by the air pump 6 and has been removed or manifested a change in its shape as a result of a removal operation performed at least once by the washer pump 7 will be determined to be mud. The CPU 12 may output accumulation type information to the cleaning control unit 5 as a control quantity in a control signal.

In step S347, the CPU 12 outputs the accumulation information input thereto in step S340 to the device selection unit 32. Subsequently, the CPU 12 proceeds to execute the processing in step S341.

Figure 8:
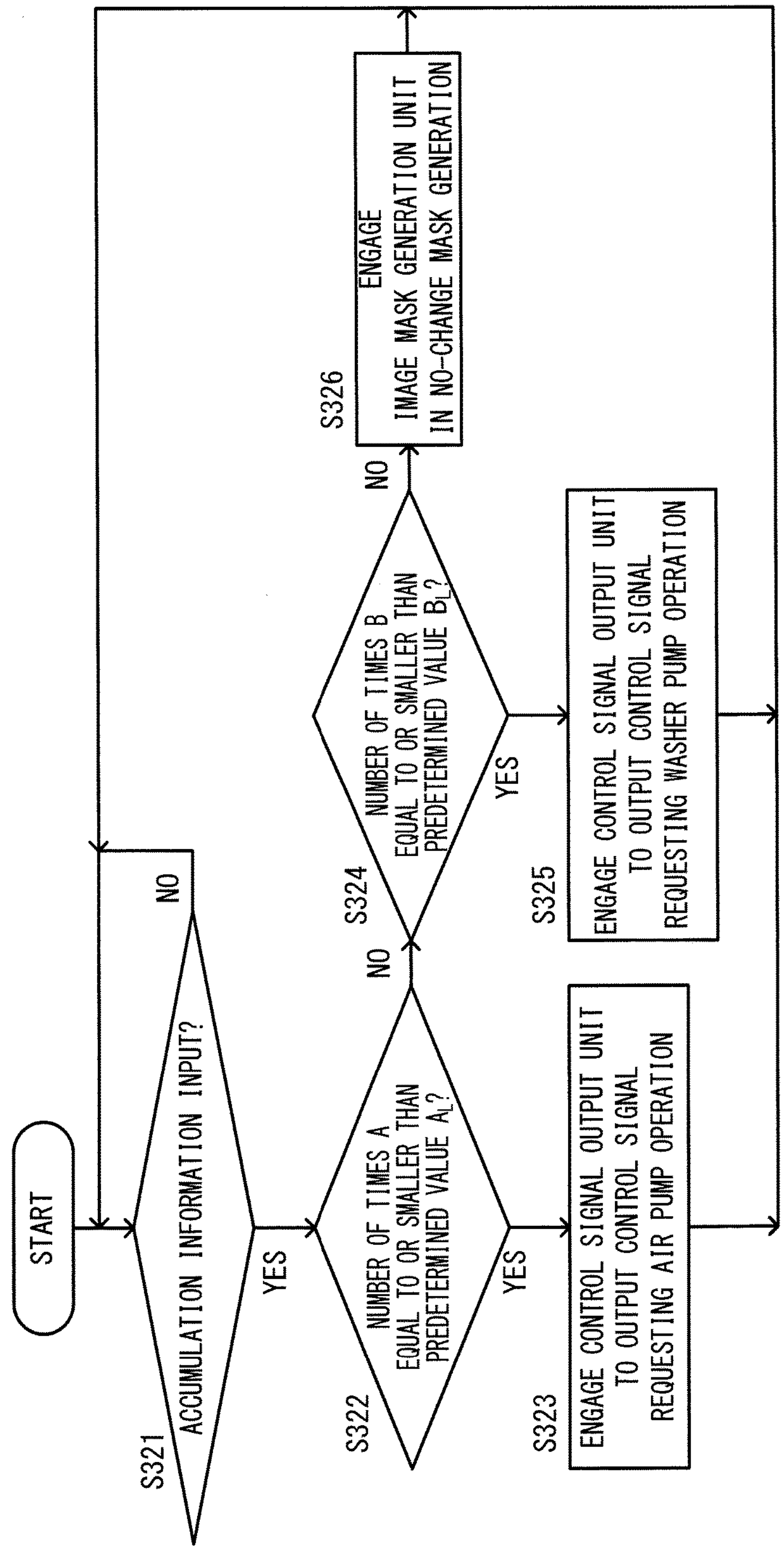

FIG. 8 presents a flowchart pertaining to the device selection unit 32. The flowchart presented in FIG. 8 shows an example of processing executed when the device selection unit 32 selects an accumulation removing unit by giving priority to the air pump 6.

In step S321, the CPU 12 makes a decision as to whether or not accumulation information has been input from the accumulation detection unit 31 or the removal decision unit 34 in step S347 in FIG. 7. Accumulation information is input from the accumulation detection unit 31 when an accumulation is detected by the accumulation detection unit 31. In addition, accumulation information is input from the removal decision unit 34 when the removal decision unit 34 decides in step S345 that an image of an unremoved accumulation is included in the differential image, i.e., the removal decision unit 34 decides that an accumulation has remained unremoved. The CPU 12 repeatedly executes the processing in step S321 until accumulation information is input to the device selection unit 32. Once accumulation information has been input to the device selection unit 32, the CPU 12 proceeds to execute the processing in step S322.

In step S322, the CPU 12 makes a decision as to whether or not the number of times A stored in the RAM 10 is equal to or smaller than a predetermined value $A_L$ ($A_L$=3, for instance). Upon making an affirmative decision in step S322, the CPU 12 proceeds to execute the processing in step S323, whereas upon making a negative decision in step S322, it proceeds to execute the processing in step S324.

In step S323, the CPU 12 selects the air pump 6 as the accumulation removing unit and engages the control signal output unit 33 in operation so as to output a control signal requesting operation of the air pump 6 to the cleaning control unit 5. Once the processing in step S323 has been completed, the CPU 12 proceeds to execute the processing in step S321. The cleaning control unit 5, having received the control signal from the control signal output unit 33 input thereto, engages the air pump 6 in a removal operation and, following the removal operation, outputs an operation complete signal to the removal decision unit 34.

In step S324, the CPU 12 makes a decision as to whether or not the number of times B stored in the RAM 10 is equal to or smaller than a predetermined value $B_L$ ($B_L$=1, for instance). Upon making an affirmative decision in step S324, the CPU 12 proceeds to execute the processing in step S325, whereas upon making a negative decision in step S324, it proceeds to execute the processing in step S326.

In step S325, the CPU 12 selects the washer pump 7 as the accumulation removing unit and engages the control signal output unit 33 in operation so as to output a control signal requesting operation of the washer pump 7 to the cleaning control unit 5. Once the processing in step S325 has been completed, the CPU 12 proceeds to execute the processing in step S321. The cleaning control unit 5, having received the control signal from the control signal output unit 33 input thereto, engages the washer pump 7 in a removal operation and, following the removal operation, outputs an operation complete signal to the removal decision unit 34.

In step S326, the mask image generation unit 35 is engaged in operation for no-change mask generation. Once the processing in step S326 has been completed, the CPU 12 proceeds to execute the processing in step S321.

The following advantages are achieved through the first embodiment described above.

The on-board device 100 includes the control unit 2. The control unit 2 outputs a control signal to the cleaning control unit 5, which controls the air pump 6 and the washer pump 7 for removing accumulation settled on the photographic lens in the camera 1. The control unit 2 includes the accumulation detection unit 31 that detects an accumulation having settled on the photographic lens based upon a photographic image output from the camera 1, the device selection unit 32 that selects one or more accumulation removing units among a plurality of accumulation removing units, the removal decision unit 34 that makes a decision based upon a photographic image, as to whether or not the accumulation has been removed from the photographic lens through removal operation performed by the one or more accumulation removing units selected by the device selection unit 32 and the control signal output unit 33 that outputs a control signal, which includes at least information pertaining to the one or more accumulation removing units selected by the device selection unit 32, to the cleaning control unit 5. The device selection unit 32 selects one or more accumulation removing units based upon the number of times A and the number of times B each indicating the number of times a removal operation has been performed by engaging a specific accumulation removing unit among the plurality of accumulation removing units when accumulation information is input from the accumulation detection unit 31 or the removal decision unit 34 through step S321, i.e., when the accumulation detection unit 31 detects an accumulation having settled on the photographic lens or when the removal decision unit 34 decides that an accumulation has not been removed from the photographic lens. Under control executed by the control unit 2 in the first embodiment of the present invention structured as described above, the photographic lens in the on-board camera can be cleaned in an optimal manner.

The control unit 2 further includes the mask image generation unit 35 that; if the removal decision unit 34 decides that an accumulation has not been removed from the photographic lens even after a removal operation has been performed by engaging each of the plurality of accumulation removing units a predetermined number of times set in correspondence to the particular accumulation removing unit, generates an image of the unremoved accumulation as the no-change mask and stores the no-change mask in the RAM 10. The accumulation stored as the no-change mask in the RAM 10 is not regarded as a detection target by the accumulation detection unit 31. Through these measures, repeated detection of a scratch on the lens, an accumulation settled on the light shielding plate 1*a* and the like that cannot be removed by the accumulation removing units by the accumulation detection unit 31 is prevented and thus an unnecessary cleaning operation is not persistently performed.

When the number of times A the air pump 6 has been engaged in a removal operation is equal to or smaller than the predetermined value $A_L$ ("YES" in step S322 in FIG. 8), the device selection unit 32 in the control unit 2 selects the air pump 6 (step S323). When the number of times A the air pump 6 has been engaged in a removal operation is greater than the predetermined value $A_L$ ("NO" in step S322 in FIG. 8) and the number of times B the washer pump 7 has been engaged in a removal operation is equal to or smaller than a predetermined value $B_L$ ("YES" in step S324), it selects the washer pump 7 (step S325). When the number of times A the air pump 6 has been engaged in a removal operation is greater than the predetermined value $A_L$ ("NO" in step S322) and the number of times B the washer pump 7 has been engaged in a removal operation is greater than a predetermined value $B_L$ ("NO" in step S324), the mask image generation unit 35 stores an image of any unremoved accumulation into the RAM 10. Through these measures, accumulations can be removed by identifying different types of accumulations, e.g., an accumulation removed through a removal operation performed by the air pump 6 is a water drop or the like and an accumulation removed through the removal operation performed by the washer pump 7 is mud or the like. FIG. 14 presents a chart indicating specific types of cleaning devices (air, washer, wiper) and whether or not different types of accumulations (water drops, mud, water stains and scratches on the lens) can be removed by these cleaning devices. By engaging a specific cleaning device in operation and verifying the results of the operation, the type of target accumulation can be roughly determined. By executing statistical processing on such information and using the processing results in feedback control, the number of times A and the number of times B can be adjusted to accommodate the individual user's operating tendencies.

Second Embodiment

Figure 9:
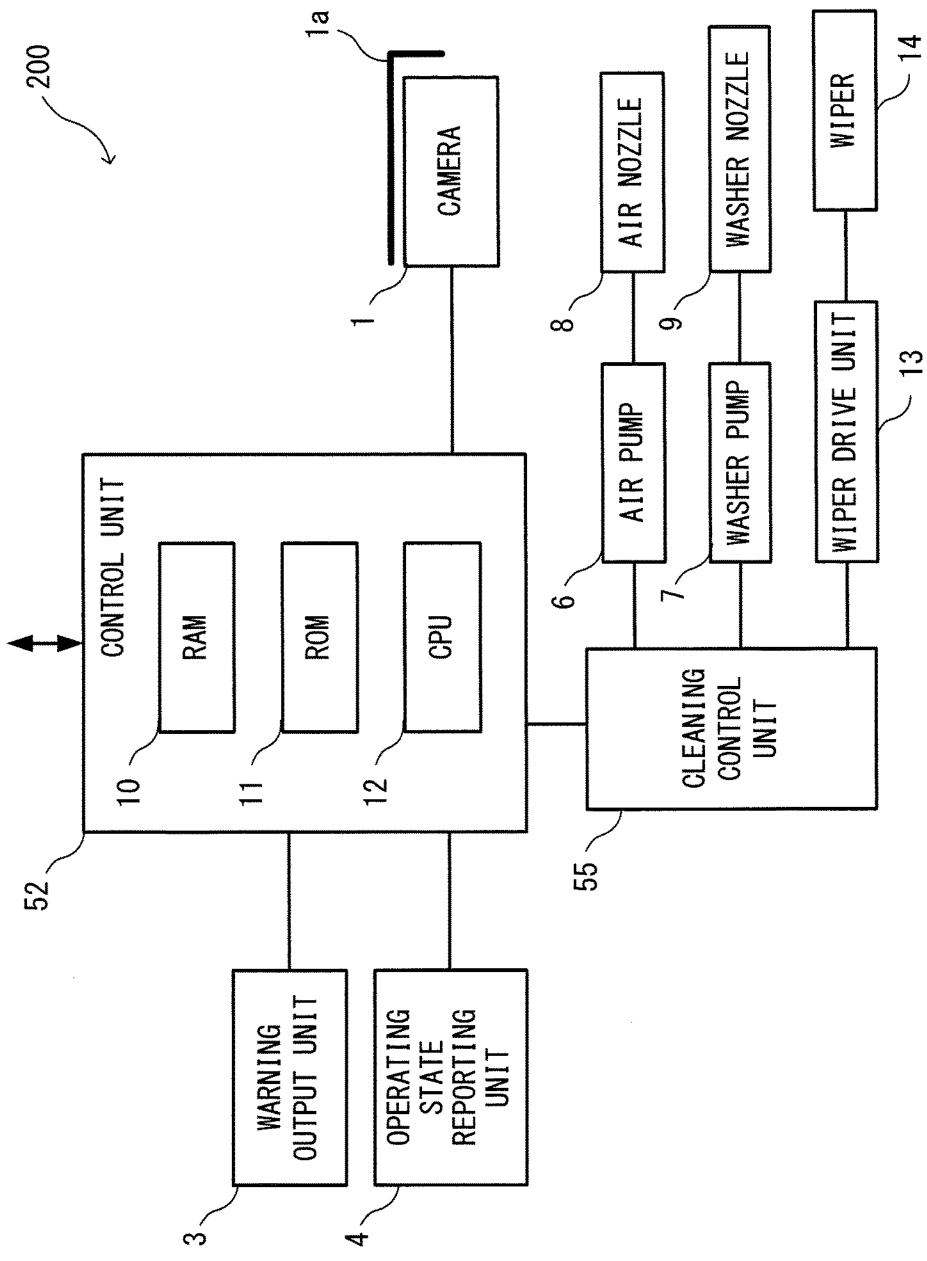

FIG. 9 is a block diagram pertaining to the on-board device achieved in the second embodiment. An on-board device 200 is distinguishable from the on-board device 100 in the first embodiments in that it includes a wiper 14 that wipes the photographic lens in the camera 1 and a wiper drive unit 13 that drives the wiper 14. A cleaning control unit 55, which is equivalent to the cleaning control unit 5 in the first embodiment, further controls operation of the wiper drive unit 13, in addition to operations of the air pump 6 and the washer pump 7. With the wiper 14, a persistent accumulation such as a water stain, which cannot be removed easily with the washer liquid, can be wiped off from the photographic lens with relative ease. The cleaning control unit 55 outputs an operation complete signal to the removal decision unit 34 when the removal operation performed by the wiper drive unit 13 is completed as well.

FIG. 10 is a control block diagram pertaining to the control executed for the on-board device in the second embodiment. The control block diagram in FIG. 10 differs from the control block diagram in FIG. 4 in that it includes a control unit 52, the cleaning control unit 55 and a device selection unit 36 instead of the control unit 2, the cleaning control unit 5 and the device selection unit 32. It is to be noted that the same reference numerals are assigned to units engaged in processing similar to that in the control block diagram in FIG. 4 so as to preclude the necessity for a repeated explanation thereof.

The device selection unit 36 selects an accumulation removing unit among the air pump 6, the washer pump 7 and the wiper drive unit 13 based upon the number of times A the air pump 6 has been engaged in operation, the number of times B the washer pump 7 has been engaged in operation and a number of times C the wiper drive unit 13 has been engaged in operation.

FIG. 11 presents a flowchart of processing pertaining to the device selection unit 36 that is executed by the control unit 52. The processing shown in FIG. 11 includes processing related to the wiper drive unit 13, executed in step S366 and step S367.

In step S361 in FIG. 11, the CPU 12 executes processing similar to that in step S321 in FIG. 8. In step S362 in FIG. 11, the CPU 12 executes processing similar to that in step S322 in FIG. 8. Upon making an affirmative decision in step S362, the CPU 12 proceeds to execute the processing in step S363, whereas upon making a negative decision in step S362, it proceeds to execute the processing in step S364. In step S363 in FIG. 11, the CPU 12 executes processing similar to that in step S323 in FIG. 8.

The decision executed in step S364 in FIG. 11 is similar to that executed in step S324 in FIG. 8, except that the CPU 12 proceeds to step S366 to make a decision with regard to the wiper drive unit 13 upon making a negative decision in step S364. If, on the other hand, an affirmative decision is made in step S364, the CPU 12 proceeds to execute the processing in step S365 just as it proceeds to step S325 after making an affirmative decision in step S324 in FIG. 8. In step S365 in FIG. 11, the CPU 12 executes processing similar to that executed in step S325 in FIG. 8.

In step S366 in FIG. 11, the CPU 12 makes a decision as to whether or not the number of times C stored in the RAM 10 is equal to or smaller than a predetermined value $C_L$ ($C_L$=3, for instance). Upon making an affirmative decision in step S366, the CPU 12 proceeds to execute the processing in step S367, whereas upon making a negative decision in step S366, it proceeds to execute the processing in step S368.

In step S367 in FIG. 11, the CPU 12 selects the wiper drive unit 13 as the accumulation removing unit and engages the control signal output unit 33 in operation so as to output a control signal requesting operation of the wiper drive unit 13 to the cleaning control unit 55. Once the processing in step S367 has been completed, the CPU 12 proceeds to execute the processing in step S361. The cleaning control unit 55, having received the control signal from the control signal output unit 33 input thereto, engages the wiper drive unit 13 in a removal operation and, following the removal operation, outputs an operation complete signal to the removal decision unit 34. If the accumulation is removed from the photographic lens in the camera 1 through the removal operation performed by the wiper drive unit 13 in response to the control signal output in step S367 in FIG. 11, the removal decision unit 34 determines in step S346 that the accumulation was a water stain or the like. It is to be noted that processing similar to that in step S326 in FIG. 8 is executed in step S368 in FIG. 11.

It is to be noted that the removal decision unit 34 makes a decision in step S346 (see FIG. 7) with regard to the type of removed accumulation, as in the first embodiment. The CPU 12 determines the type of each removed accumulation based upon the change in the luminance of the pixel cluster representing the accumulation, observed in the post-removal operation state relative to the pre-removal operation state, the size or shape of the accumulation, the number of times A, the number of times B, the number of times C, the specific type of the accumulation removing unit most recently engaged in operation and the like. For instance, it may identify an accumulation that remained unremoved even after the air pump 6 was engaged in a removal operation three times and the washer pump 7 was engaged in a removal operation once or more but has been removed or has manifested a change in its shape as a result of a removal operation performed by engaging the wiper drive unit 13 once or more, as a water stain.

The following advantages are achieved through the second embodiment described above.

The on-board device 200 includes the control unit 52. The control unit 52 outputs a control signal to the cleaning control unit 55, which controls the air pump 6, the washer pump 7 and the wiper drive unit 13, all engaged in operation in order to remove accumulations settled on the photographic lens in the camera 1. The control unit 52 includes the accumulation detection unit 31 that detects an accumulation having settled on the photographic lens based upon a photographic image output from the camera 1, the device selection unit 36 that selects one or more accumulation removing units among a plurality of accumulation removing units, the removal decision unit 34 that makes a decision based upon a photographic image, as to whether or not the accumulation has been removed from the photographic lens through removal operation performed by the one or more accumulation removing units selected by the device selection unit 36, and the control signal output unit 33 that outputs a control signal, which includes at least information pertaining to the one or more accumulation removing units selected by the device selection unit 36, to the cleaning control unit 55. The device selection unit 36 selects one or more accumulation removing units based upon the number of times A, the number of times B and the number of times C, each indicating the number of times a removal operation has been performed by engaging a specific accumulation removing unit among the plurality of accumulation removing units when accumulation information is input from the accumulation detection unit 31 or the removal decision unit 34 through step S361, i.e., when the accumulation detection unit 31 detects an accumulation having settled on the photographic lens or when the removal decision unit 34 decides that an accumulation has not been removed from the photographic lens. Under control executed by the control unit 52 in the second embodiment of the present invention structured as described above, the photographic lens in the on-board camera can be cleaned in an optimal manner.

When the number of times A the air pump 6 has been engaged in a removal operation is equal to or smaller than the predetermined value $A_L$ ("YES" in step S362 in FIG. 11), the device selection unit 36 in the control unit 52 selects the air pump 6 (step S363). When the number of times A the air pump 6 has been engaged in a removal operation is greater than the predetermined value $A_L$ ("NO" in step S362) and the number of times B the washer pump 7 has been engaged in a removal operation is equal to or smaller than the predetermined value $B_L$ ("YES" in step S364), it selects the washer pump 7 (step S365). When the number of times A the air pump 6 has been engaged in a removal operation is greater than the predetermined value $A_L$ ("NO" in step S362), the number of times B the washer pump 7 has been engaged in a removal operation is greater than the predetermined value $B_L$ ("NO" in step S364) and the number of times C the wiper drive unit 13 has been engaged in a removal operation is equal to or smaller than the predetermined value $C_L$ ("YES" in step S366), the wiper drive unit 13 is selected. When the number of times A the air pump 6 has been engaged in a removal operation is greater than the predetermined value $A_L$ ("NO" in step S362), the number of times B the washer pump 7 has been engaged in a removal operation is greater than the predetermined value $B_L$ ("NO" in step S364) and the number of times C the wiper drive unit 13 has been engaged in a removal operation is greater than the predetermined value $C_L$, the mask image generation unit 35 stores an image of any unremoved accumulation into the RAM 10. Through these measures, accumulations can be removed by identifying the type of each accumulation, as indicated in FIG. 14, e.g., an accumulation having been removed through a removal operation performed by the air pump 6 is a water drop or the like, an accumulation having been removed through a removal operation performed by the washer pump 7 is mud or the like and an accumulation having been removed through a removal operation by the wiper drive unit 13 is a water stain or the like. By executing statistical processing on such information and using the processing results in feedback control, the number of times A, the number of times B and the number of times C can be adjusted for the individual user's operating tendencies.

Third Embodiment

The on-board device achieved in the third embodiment will be described next. The on-board device achieved in this embodiment, substantially identical to the on-board device in the first embodiment, is only distinguishable in that the accumulation detection unit 31 is engaged in operation while the vehicle is in a traveling state.

Image recognition processing is executed in the third embodiment through the LDW function, the PED function, the RSR function and the IMD function which are all engaged while the vehicle is in a traveling state, and the accumulation detection unit 31 is engaged in operation when the vehicle is traveling at a speed equal to or higher than a predetermined vehicle speed (e.g., 5 km/h). A decision as to whether or not the vehicle is traveling at a speed equal to or higher than the predetermined vehicle speed is made via a vehicle speed sensor (not shown).

The mud detection unit 313 in the accumulation detection unit 31, for instance, is capable of deciding whether or not mud has built up by capturing images at two different time points via the camera 1, generating a differential image with the two images and determining the shape of a differential area in the differential image.

In reference to FIG. 15, the method adopted in the differential image generation will be described. A differential image is generated by calculating the difference between a most recent photographic image and the reference image. The reference image is generated based upon past photographic images preceding the most recent photographic image and having been output consecutively in time series from the camera 1.

Figure 15:
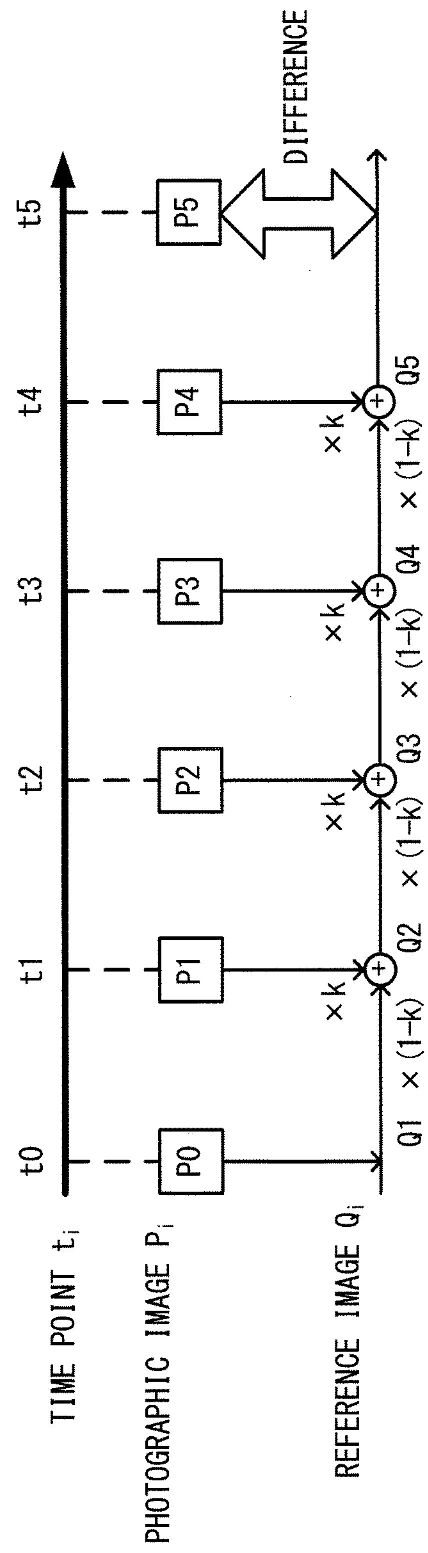

FIG. 15 shows an arrow indicating the passage of time, and above the arrow, time points $t_0$ through $t_5$ are indicated in correspondence to the frame rate of the camera 1. The figure shows photographic images $P_0$ through $P_5$ output from the camera 1 respectively at the time points $t_0$ through $t_5$, under the arrow indicating the passage of time.

Each time an image among the photographic images $P_0$ through $P_5$ is output from the camera 1, the image is stored into the RAM 10. It is assumed that the storage of the photographic images into the RAM 10 starts at the time point $t_0$. Namely, in the example presented in FIG. 15, the photographic image $P_0$ is the oldest photographic image among the photographic images stored in the RAM 10 and the photographic image $P_5$ is the most recent photographic image.

A reference image $Q_i$ is generated when a new photographic image $P_i$ is output from the camera 1 (e.g., at the time point $t_5$) as expressed in (1) and (2) below by using a photographic image $P_{i-1}$ having been stored into the RAM 10 most recently (e.g., the photographic image $P_4$) and a reference image $Q_{i-1}$ having been used as the reference image up to the point at which the photographic image $P_i$ is output.

$$Q_i=P_{i-1} \text{ (when } i=1\text{)} \quad (1)$$

$$Q_i=k\times P_{i-1}+(1-k)\times Q_{i-1} \text{ (when } i\geq 2\text{)} \quad (2)$$

k in expression (2) is a coefficient taking a value within the range of $0<k\leq 1$. For instance, k=0.1.

The mud detection unit 313 generates a differential image expressing the difference between the photographic image most recently output from the camera 1 (e.g., the photographic image $P_5$) and the reference image generated at the point at which the most recent photographic image is output (e.g., the reference image $Q_5$).

Subsequently, it makes decisions with regard to the shape of each differential area as to, for instance, whether or not its areal size is within a predetermined range, and whether or not the aspect ratio of the differential area is within a predetermined range. If the shape of the differential area satisfies these criteria, it decides that mud has accumulated, and then outputs information indicating the positions and the number of accumulations.

The structure described above enables accumulation detection while the vehicle is traveling at a speed equal to or higher than the predetermined vehicle speed.

The embodiments described above allow for the following variations.

(Variation 1) The device selection unit 32 or 36 may select a plurality of accumulation removing units at once. For instance, it may select an option in step S325 so that the washer liquid is first output and then compressed air is output. In addition, when the number of times A a removal operation has been performed by the air pump 6 is greater than the predetermined value $A_L$ and the number of times B a removal operation has been performed by the washer pump 7 is equal to or smaller than the predetermined value $B_L$, the washer liquid and compressed air may be output simultaneously. Furthermore, the plurality of accumulation removing units are not limited to the air pump 6, the washer pump 7 and the wiper drive unit 13, and other accumulation removing units that can be selected by the device selection unit 32 or the device selection unit 36 may be added. As an alternative, any one of the air pump 6, the washer pump 7 and the wiper drive unit 13 may be replaced by another accumulation removing unit. Moreover, the air pump 6 may be configured so that it can also function as the washer pump 7.

(Variation 2) The camera 1 does not need to include the light shielding plate 1*a*.

(Variation 3) The daytime water drop detection unit 311, the nighttime water drop detection unit 312, the mud detection unit 313, the water stain detection unit 314 and the like configuring the accumulation detection unit 31 in FIG. 4 and FIG. 10 simply represent examples and the accumulation detection unit 31 does not need to include all these detection units or it may further include a lens scratch detection unit capable of detecting scratches on the lens.

It is to be noted that the embodiments and variations described above simply represent examples and the present invention is in no way limited to these examples. In addition, as long as the features characterizing the present invention remain intact, the embodiments and variations described above may be adopted in combination. For instance, the third embodiment may be adopted in combination with the first embodiment or the second embodiment. In other words, the accumulation detection unit 31 in the first embodiment or the second embodiment may be engaged in operation when the vehicle is traveling at a speed equal to or higher than the predetermined vehicle speed, as in the third embodiment.

The disclosure of the following priority application is herein incorporated by reference:

Japanese Patent Application No. 2012-149868 filed Jul. 3, 2012

EXPLANATION OF REFERENCE NUMERALS

1: camera, 1*a*: light shielding plate, 3: warning output unit, 6: air pump, 7: washer pump, 31: accumulation detection unit, 33: control signal output unit, 34: removal decision unit, 35: mask image generation unit

2: control unit, 5: cleaning control unit, 32: device selection unit, 100: on-board device

13: wiper drive unit, 52: control unit, 55: cleaning control unit, 36: device selection unit, 200: on-board device

The invention claimed is:

1. An on-board device, that outputs a control signal to a cleaning control unit that controls accumulation removing units used to remove accumulations settled on a photographic lens in an on-board camera by adopting a plurality of methods, comprising:

an accumulation detection unit that detects an accumulation settled on the photographic lens from a photographic image output from the on-board camera when a vehicle speed input thereto is equal to or higher than a predetermined vehicle speed;

a selection unit that selects an accumulation removing unit adopting a first method among the accumulation removing units adopting the plurality of methods;

a removal decision unit that determines, based upon the photographic image, whether or not the accumulation has been removed from the photographic lens through a removal operation performed by the accumulation removing unit adopting the first method, which has been selected by the selection unit; and a mask image storing unit that stores, if the removal decision unit determines that an accumulation has not been removed from the photographic lens even after a removal operation has been performed by engaging each of the accumulation removing units adopting the plurality of methods a predetermined plurality of number of times set in correspondence to each of the accumulation removing units adopting the plurality of methods, an image of the unremoved accumulation as a mask image, wherein the accumulation detection unit determines the accumulation stored as the mask image in the mask image storing unit as a non-detection target, wherein:

if the removal decision unit determines that the accumulation has not been removed from the photographic lens, the selection unit selects an accumulation removing unit adopting a second method, different from the accumulation removing unit adopting the first method;

the accumulation removing unit adopting the first method removes the accumulation by using compressed air;

the accumulation removing unit adopting the second method removes the accumulation by using a washer liquid;

when a number of times a removal operation has been performed by engaging the accumulation removing unit adopting the first method is equal to or smaller than a first predetermined value, the selection unit selects the accumulation removing unit adopting the first method;

when a number of times a removal operation has been performed by engaging the accumulation removing unit adopting the first method is greater than the first predetermined value and the number of times a removal operation has been performed by engaging the accumulation removing unit adopting the second method is equal to or smaller than a second predetermined value, the selection unit selects the accumulation removing unit adopting the second method; and when the number of times a removal operation has been performed by engaging the accumulation removing unit adopting the first method is greater than the first predetermined value and the number of times a removal operation has been performed by engaging the accumulation removing unit adopting the second method is greater than the second predetermined value, the mask image storing unit stores the mask image.

2. The on-board device according to claim 1, wherein:

the accumulation removing unit adopting the plurality of methods further includes an accumulation removing unit adopting a third method that removes the accumulation by using a wiper;

when the number of times a removal operation has been performed by engaging the accumulation removing unit adopting the first method is equal to or smaller than the first predetermined value, the selection unit selects the accumulation removing unit adopting the first method;

when the number of times a removal operation has been performed by engaging the accumulation removing unit adopting the first method is greater than the first predetermined value and the number of times a removal operation has been performed by engaging the accumulation removing unit adopting the second method is equal to or smaller than the second predetermined value, the selection unit selects the accumulation removing unit adopting the second method;

when the number of times a removal operation has been performed by engaging the accumulation removing unit adopting the first method is greater than the first predetermined value, the number of times a removal operation has been performed by engaging the accumulation removing unit adopting the second method is greater than the second predetermined value and the number of times a removal operation has been performed by engaging the accumulation removing unit adopting the third method is equal to or smaller than a third predetermined value, the selection unit selects the accumulation removing unit adopting the third method; and when the number of times a removal operation has been performed by engaging the accumulation removing unit adopting the first method is greater than the first predetermined value, the number of times a removal operation has been performed by engaging the accumulation removing unit adopting the second method is greater than the second predetermined value and the number of times a removal operation has been performed by engaging the accumulation removing unit adopting the third method is greater than the third predetermined value, the mask image storing unit stores the mask image.

3. The on-board device according to claim 1, wherein:

the removal decision unit further determines a type of accumulation that has been removed through the removal operation performed by an accumulation removing unit, which was selected by the selection unit, among the accumulation removing units adopting the plurality of methods;

the removal decision unit identifies an accumulation that has been removed through the removal operation performed by the accumulation removing unit adopting the first method as a water drop accumulation; and the removal decision unit identifies an accumulation that has been removed through the removal operation performed by the accumulation removing unit adopting the second method as a mud accumulation.

4. The on-board device according to claim 2, wherein:

the removal decision unit further determines a type of accumulation that has been removed through the removal operation performed by an accumulation removing unit, which was selected by the selection unit, among the accumulation removing units adopting the plurality of methods;

the removal decision unit identifies an accumulation that has been removed through the removal operation performed by the accumulation removing unit adopting the first method as a water drop accumulation;

the removal decision unit identifies an accumulation that has been removed through the removal operation performed by the accumulation removing unit adopting the second method as a mud accumulation; and the removal decision unit identifies an accumulation that has been removed through the removal operation performed by the accumulation removing unit adopting the third method as a water stain accumulation.

* * * * *